Feb. 6, 1962  F. V. GUILBERT  3,020,009
LANDING SKID EQUIPPED WITH AUXILIARY WHEEL
Filed Feb. 2, 1959  3 Sheets-Sheet 1
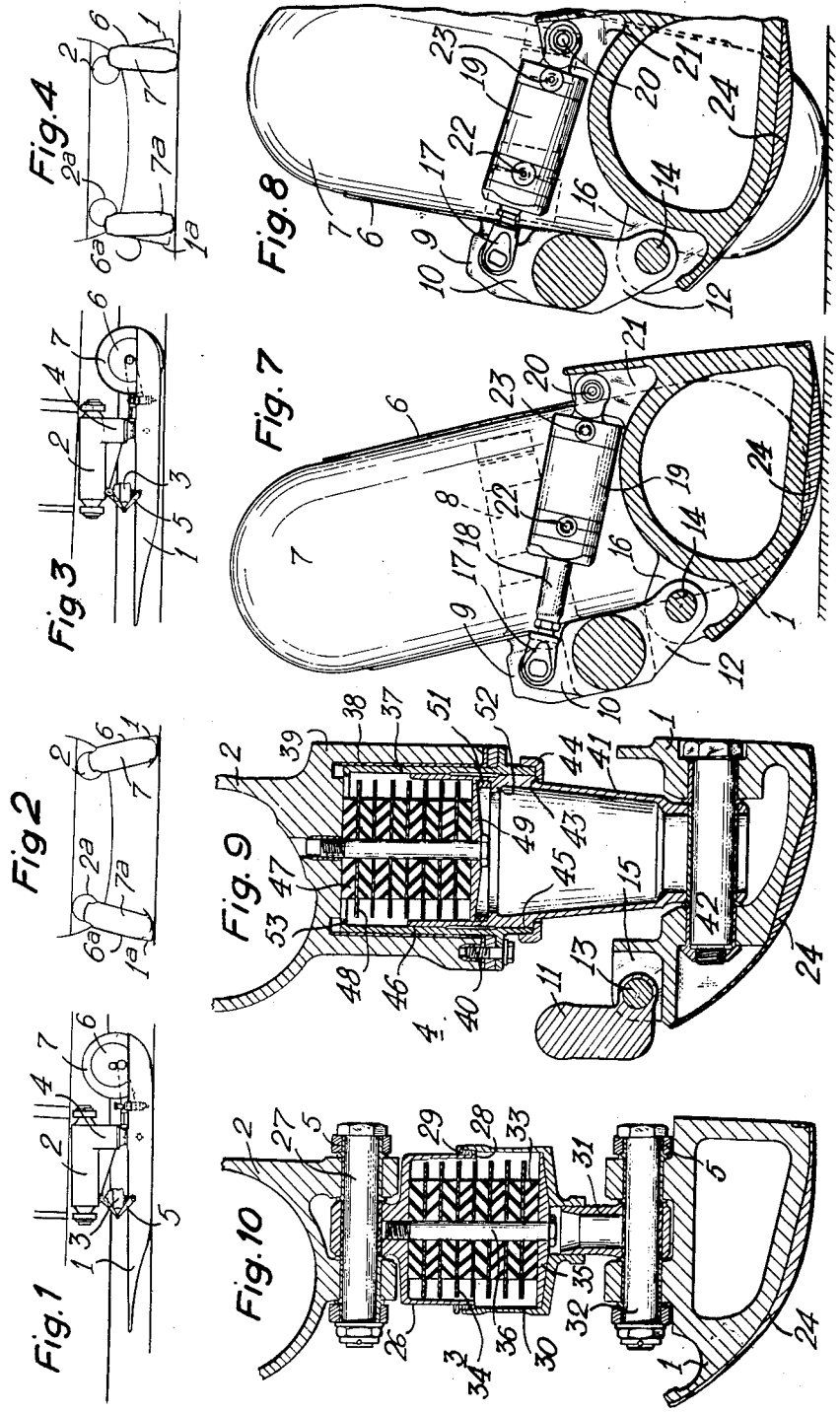

Feb. 6, 1962  F. V. GUILBERT  3,020,009
LANDING SKID EQUIPPED WITH AUXILIARY WHEEL
Filed Feb. 2, 1959  3 Sheets-Sheet 2

United States Patent Office 3,020,009
Patented Feb. 6, 1962

3,020,009
LANDING SKID EQUIPPED WITH
AUXILIARY WHEEL
Francois Victor Guilbert, La Garenne-Colombes, France, assignor to Sud-Aviation Societe Nationale de Constructions Aeronautiques, Paris, Seine, France
Filed Feb. 2, 1959, Ser. No. 790,410
Claims priority, application France Feb. 6, 1958
7 Claims. (Cl. 244—102)

The present invention relates to improvements in landing skid assemblies having two landing skids equipped with auxiliary wheels.

It is well known that aircraft equipped with landing skids are capable of landing on various surfaces. The drag hooks fitted to the skids can be used with advantage on natural terrain, but tend to be fragile on stony soil and are ineffective on very hard surfaces of the cement or concrete type.

With a view to overcoming this drawback and providing effective means of shortening the landing run on hard or concrete-covered surfaces as well as on grassy soil, the present invention has for its object a skid-type undercarriage equipped with auxiliary wheels, in which each auxiliary wheel located to the rear of the corresponding skid is fitted with a high-pressure tire and can occupy either of two alternative positions in relation to the skid when the latter is in its operative position, these positions being controlled at will be the pilot. In one of these positions the wheels are inoperative and merge into the lines of the skids, while in the other they project from the skid profile, each wheel automatically retracting and merging into the lines of the skid whenever its normal load is exceeded by about 30%, thus ensuring stepped damping in association with the shock-absorbers of the corresponding skid.

Further, the skid-type undercarriage equipped with auxiliary wheels of the type specified above is preferably fitted with a device providing a greater degree of damping to vertical shocks than is provided by normal damping means.

Further to those provided by undercarriages fitted with conventional skids, the skid-type undercarriage equipped with auxiliary wheels according to the invention offers the following extra advantages:

(a) Stepped damping of vertical shocks by retraction of the wheels in relation to the skids.

(b) Possibility of increasing braking energy on grassy soil, the wheels fitted with high-pressure tires acting as veritable drag hooks in such cases.

(c) Possibility of using and braking the wheels on concrete or other hard surfaces.

(d) Greater mobility on the ground by bringing the skid wheels into the operating position.

(e) Big reduction in skid wear, the lengths of time during which the load exerted on the wheels is some 30% greater than the normal loading being very short.

Further characteristics of the invention will become apparent from the description given hereinafter in connection with the accompanying drawings provided by way of example only and not in any limiting sense, this description being intended to give a clear understanding of how the invention may be put into practice. In the drawings:

FIGURES 1 and 2 are schematic views, in side and front elevation respectively, of a skid-type undercarriage mounted on an aircraft and equipped with auxiliary wheels according to the invention, the skids being shown in the operative position with wheels retracted.

FIGURES 3 and 4 are schematic views, in side and front elevation respectively, of a skid-type undercarriage mounted on an aircraft and equipped with auxiliary wheels according to the invention, the skids being shown in the operative position with wheels lowered.

FIGURES 7 and 8 are partially sectioned views of FIG. 5 taken along the line VII—VII, showing the wheel in retracted and in lowered position respectively.

FIGURE 9 is a sectional view of FIG. 5 taken along the line IX—IX, the shock-absorber being in the no-load condition.

FIGURE 10 is a similar sectional view of the skid-type undercarriage equipped with auxiliary wheels, through the front shock-absorber.

Figure 5:
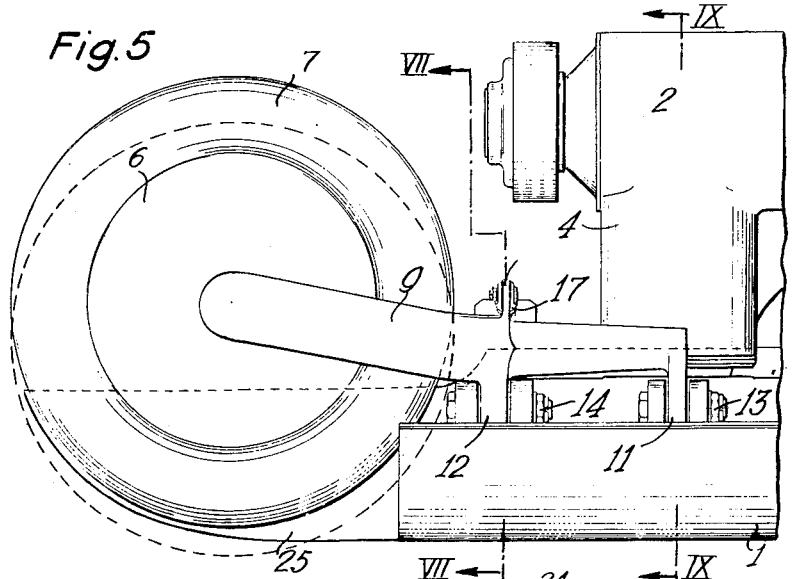
FIGURES 5 and 6 are interior and plan views respectively of the rear portion of the port skid, shown under load.

The undercarriage shown in the drawings comprises a pair of landing skids 1 and 1a, in the form of hollow girders, connected to retraction supports 2 and 2a of the type disclosed in the U.S. Patent No. 2,741,446 through the medium of front shock-absorbers 3 and rear shock-absorbers 4 designed to damp vertical shocks and of hinged connections 5 associated in pairs to the front shock-absorbers. At their rear, these skids are equipped with wheels 6 and 6a fitted with high-pressure tires 7 and 7a. The support 2 serves as a housing for a torque-damper of the type described in the U.S. patent referred to above.

As illustrated in FIGS. 5 to 8, each wheel 6 is carried by a stub-axle 8 forged on a part 9 provided with an upper lug 10. This part is articulated by means of a terminal lug 11 and an intermediate lug 12, on two longitudinal axles 13 and 14 carried by the skid 1 in two yokes 15 and 16 respectively provided on the inner wall of the skid. On lug 10 is pivotably mounted a fork 17 which is fixed to the rod 18 of a double-acting jack 19 the body of which is articulated at 20 on a yoke 21 provided at the top of the outer wall of skid 1. The jack embodies two pressurized-fuel inputs 22 and 23.

When, by appropriate action, the pilot causes fluid under pressure to be delivered through input 22, the jack withdraws and moves from the position shown in FIG. 7 to that in FIG. 8. In so doing, the part 9 pivots about axles 13 and 14 and the jack about axle 20, thus canting the wheel 6 in an opposite direction in relation to the skid, while at the same time causing it to protrude therefrom so that it comes alone into contact with the ground, as shown in FIGS. 3, 4 and 8. To retract the wheel and merge it with the profile of the skid with a view to making sole use of the latter, the pilot causes fluid under pressure to be delivered through input 23, whereupon the jack 19 stretches open; the wheel then adopts the position illustrated in FIGS. 1, 2 and 7.

The control arrangement of jack 19 is preferably of the type described in the U.S. patent application Serial No. 630,803, filed on December 27, 1956, now Patent No. 2,980,368, in the names of W. J. Jakimiuk and R. G. Scoazec and assigned to Sud-Aviation Société Nationale de Constructions Aéronautiques.

Figure 12:
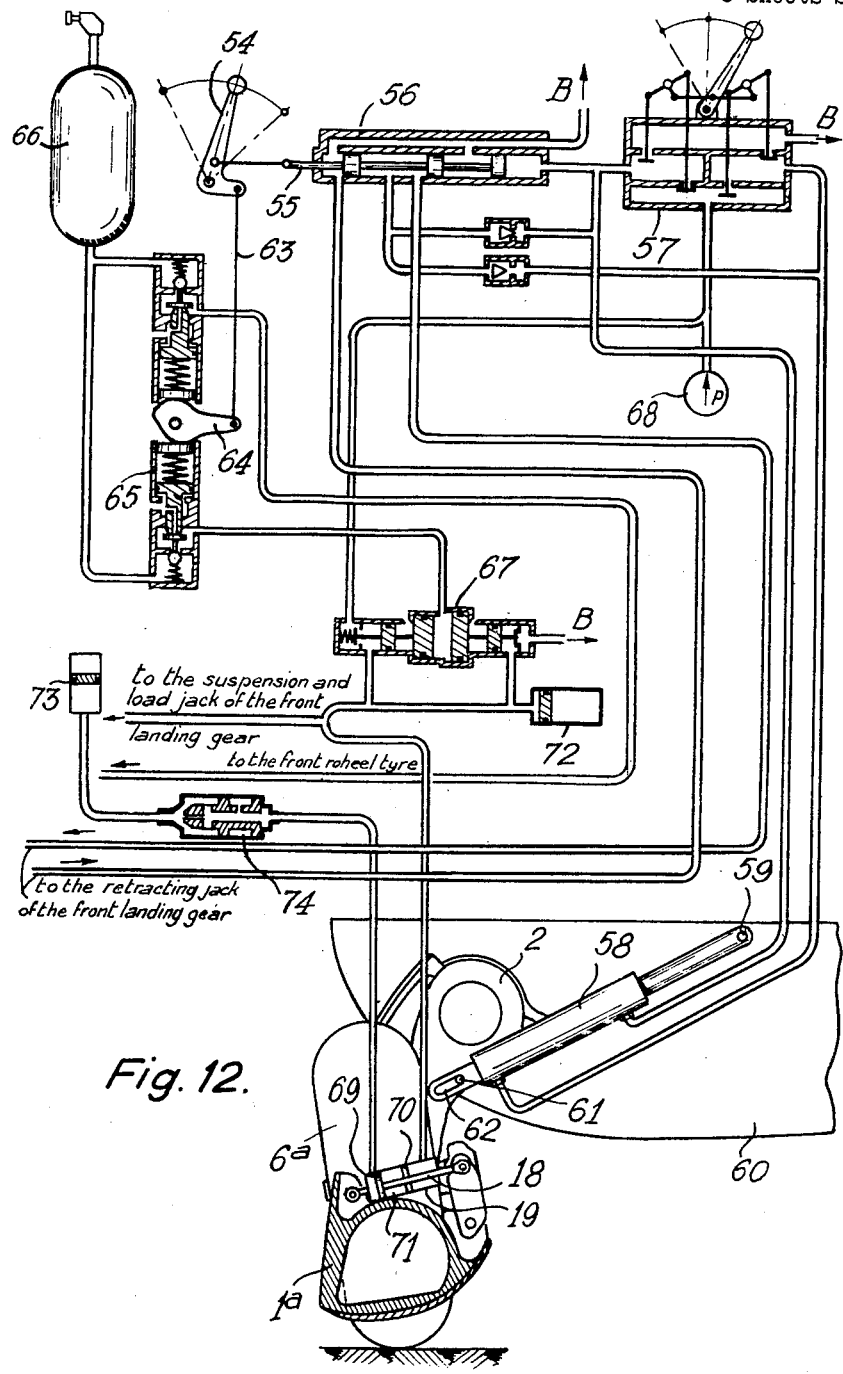
FIGURE 12 is a general line diagram illustrating the devices and networks for controlling and feeding the fluid-pressure jacks of the retractable front landing-gear and of the retractable skids illustrated in the preceding figures, of the same aircraft.

As illustrated in FIG. 12, said control arrangement comprises a control lever 54 for presetting typical ground characteristics, suitably located in the pilot's cockpit and connected to a rod 55 carrying aligned pistons slidably mounted in a distributor 56 adapted to control the actuation of the front landing gear-retracting jack, not shown, equipping the aircraft. Said distributor is connected to a second distributor 57 supplying fluid to the jacks 58 controlling the retraction and lowering of the central skids 1 and 1a provided with wheels 6 and 6a. The rods of said jacks 58 are pivotally mounted at 59 on the structure 60 of the aircraft and their bodies are connected at 61 by means of a slot 62 to the retraction supports 2 and 2a in conformity with the aforesaid U.S. Patent 2,741,446.

The presetting lever 54 is further connected through a rod 63 with the control lever 64 of a double pressure-reducing valve adjustable device 65 connected in turn to a cylinder 66 containing air under pressure. Said device 65 feeds the pneumatic part of an adjustable overpressure valve 67 the hydraulic part of which is fed by a pump 68 which feeds also the distributor 57.

The jack 19 comprises a piston 69 rigid with the rod 18 and another piston 70, an air-filled chamber 71 being located between these pistons. Said jack 19 respectively communicates at its ends with the adjustable overpressure valve 67 connected to an overpressure accumulator 72 and through a dashpot valve 74 with a re-feeding accumulator 73.

The distributors 56, 57 the adjustable pressure-reducing valve 65, the adjustable overpressure valve 67 and the dashpot valve 74 are respectively constituted as the devices 51, 58, 75, 110 and 123 of said U.S. patent application Ser. No. 630,803.

In order to lower or retract skids 1 and 1a with respect to the structure 60 as well as to retract and protrude wheels 6 and 6a in relation to the skid profile, said arrangement operates as the arrangement described in said U.S. patent application Ser. No. 630,803, with reference to its FIG. 13 and therefore it is not necessary to describe such an operation.

When the wheels 6 and 6a are in their protruding position, as illustrated in FIGS. 4, 8 and 12, if said wheels are momentarily loaded to a degree 30% greater than the normal load to which they are subjected due to the selected position of the presetting lever 54, the pistons 69 of the jacks 19 move upwards, the air cushions 71 acting as shock-absorbers. Piston 70 forces some fluid out from jack 19 and this fluid will move the pistons of the adjustable overpressure valve 67 in order to open the valves of said device 67 thus connecting the upper chamber of said jack 19 with a fluid reservoir B connected to said overpressure valve 67 and to the distributors 56 and 57. At the same time, the volume of the lower chamber of said jack 19 increases and is fed from the refeeding accumulator 73. The wheels 6 and 6a are retracted with respect to the skid profile.

It is assumed in FIG. 12 that the front landing gear of the aircraft is similar to that described in said U.S. patent application Ser. No. 680,803 and comprises a retracting jack fed by the distributor 56, a suspension and load-adjusting jack fed by the adjustable overpressure valve 67, the tire of each wheel of said front landing gear being inflated by means of the double pressure-reducing device 65. According to the adaptation of the present arrangement, the suspension and load-adjusting jack of the front landing gear could be fed by another adjustable overpressure valve similar to 67 and also connected to the double pressure-reducing device 65.

Figure 6:
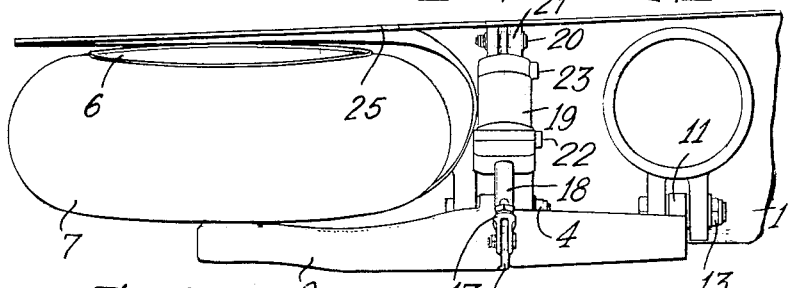

In the manner well known per se, the skid is equipped with a reinforcing hard metal member 24 and embodies a rearward extension 25 of its outer portion which serves as a fairing for the wheel 6 (see FIGS. 5 and 6).

To provide increased damping of vertical shocks, the front shock-absorber 3 comprises an upper half-shell 26 pivoting about an axle 27 carried by the support 2. This half-shell is provided with a flange 28 which comes into abutment against a ring 29 screwed over the rim of a lower half-shell 30 which is itself screwed on a hollow rod 31 articulated on an axle 32 carried by the skid 1. Within the cavity thus formed by the two half-shells 26 and 30 is disposed a stacking of alternative rubber pads 33 and metal plates 34. This stacking of pads and plates is retained by a thrust plate 35 which is free to move to-and-fro inside the half-shell 30 and which is supported in relation to the upper half-shell 26 by a bolt 36 screwed into the latter.

Total possible travel of this shock-absorber is equal to the distance between the flange 28 and the thrust plate 35. Axles 27 and 32 serve as pivots for the arms of the hinged connections 5.

As shown in FIG. 9, the rear shock-absorber comprises a hollow member 37 surrounded by a liner 38, the complete assembly fitting into a downward cylindrical extension 39 of the support 2 and being secured therein by screws 40. Inside the hollow member 37 is slidable a further hollow member 41 pivotally mounted on an axle 42 carried by the skid 1. This hollow member 41 is provided with a shoulder portion 43 by means of which it is able to bear against an open nut 44 screwed to the base of the hollow member 37, and with two bearing surfaces 45 and 46 giving it guidance along the inside of member 37. Inside the cavity thus formed is disposed a stacking of alternative rubber pads 47 and metal plates 48. These pads and plates are retained by a thrust plate 49 which is itself supported by a bolt 50. In the at-rest position, plate 49 rests on a ring 51 which itself rests on an internal ridge 52 embodied in hollow member 41. Maximum possible travel of this shock-absorber is equal to the distance separating the upper rim of hollow member 41 from an upper internal ridge 53 in hollow member 37.

Figure 11:
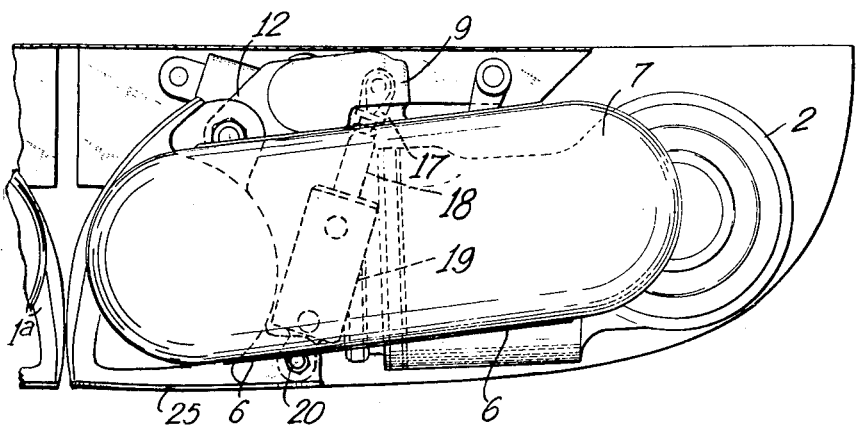
FIGURE 11 shows, viewed from the rear, the skid-type undercarriage equipped with auxiliary wheels according to the invention and to the embodiment illustrated in FIG. 5, in the retracted position.

As shown in FIGS. 11 and 12, the wheel 6, in retracted position in relation to the skid 1, is retracted into the fuselage simultaneously with the skid through the medium, say, of a retracting system of the type described in the U.S. Patent No. 2,741,446 referred to precedingly. It should be noted that when this is so, the skids, on being lowered, can adopt, due to the presence of the torque-damper in the support 2, angles of inclination in relation to the fuselage greater than their normal one for damping ground unevennesses at landing.

What I claim is:

1. Landing skid assembly for aircraft having two landing skids carried by the aircraft, comprising, in combination, auxiliary retractable wheels respectively mounted at the rear ends of the skids, high-pressure tires fitting said wheels, means interconnecting the skids, and the wheels and controlled by the pilot for controlling the retraction of said wheels with respect to the skid profiles, for landing and taking-off on a soft ground on which the skids slide, and the protrusion of said wheels with respect to said skid profiles, for landing and taking-off on a hard ground of the cement and concrete type and on a grassy soil on which the wheels run, and means connected to said control means and sensitive to the load applied on the protruding wheels in landing and taking-off conditions for controlling said control means in order to retract said wheels automatically and definitively with respect to the skid profiles as soon as said load becomes greater by about 30% than the normal load of said wheels, the skids sliding then on the ground until the landing or taking-off is ended as long as the pilot does not control a new projection of the wheels.

2. Landing skid assembly according to claim 1, wherein the pilot-controlled means for controlling the retraction and protrusion of each wheel comprises a member carrying the wheel stub-axle and pivotally mounted on one of the edges of the corresponding skid, a double-acting jack pivotally mounted on said member and on the other edge of the skid, and means for feeding said double-acting jack with a fluid under pressure.

3. Landing skid assembly, according to claim 2, wherein the means for feeding the double-acting jacks with a fluid under pressure and for controlling said jacks in order to retract the wheels automatically for an overload comprise an adjustable overpressure valve connected with said jacks, a hydraulic source under pressure connected with said adjustable overpressure valve, an adjustable pressure-reducing device controlled by the pilot and connected with said adjustable overpressure valve in order to adjust the hydraulic pressure normally applied to said jacks for controlling by the pilot the protrusion and retraction of the wheels, and a source of air under pressure connected to said adjustable pressure-reducing device.

4. Landing skid assembly according to claim 1, wherein each skid is equipped, in a manner well-known per se, with a reinforcing hard metal member, the outer portion of said skid having an extension acting as a fairing for the relevant auxiliary wheel.

5. Landing skid assembly according to claim 1, further comprising, for each skid, a retractable support pivotally mounted on the aircraft structure around an axis parallel to the longitudinal plane of symmetry of the aircraft and on which said skid is pivotally mounted, a torsional vibration damper interconnecting said structure and said support, and vertical-shock absorbers positioned between said support and said skid respectively to the front and to the rear of said skid.

6. Landing skid assembly according to claim 5, wherein the front vertical-shock absorber is pivotally mounted around pivotal axes both on the support and on the skid while the rear vertical-shock absorber is mounted for oscillation around a pivotal axis on the skid and for vertical travel on the support, and wherein a hinged connection has two arms pivotally mounted around the pivotal axes of said front vertical shock absorber.

7. Landing skid assembly according to claim 6, wherein each vertical-shock absorber comprises a stacking of pads of flexible material, metal plates respectively inserted between two successive pads of flexible material, a bolt passing with a small clearance through said stacking and secured on the support, a thrust plate slidably mounted on said bolt between the head thereof and said stacking, and a member connected to the skid and adapted to transmit to said thrust plate the vertical thrust generated by said skid when in contacting-engagement with the ground.

References Cited in the file of this patent

UNITED STATES PATENTS

| | | |
|---|---|---|
| 1,308,997 | Simmons | July 8, 1919 |
| 1,693,503 | Dworack | Nov. 27, 1928 |
| 2,106,934 | Saulnier | Feb. 1, 1938 |
| 2,390,334 | Snarey | Dec. 4, 1945 |
| 2,641,423 | Harriman et al. | June 9, 1953 |
| 2,741,446 | Jakimiuk | Apr. 10, 1956 |
| 2,864,624 | Lindelof | Dec. 16, 1958 |